(12) United States Patent
Dasgupta (10) Patent No.: US 8,427,122 B2
(45) Date of Patent: Apr. 23, 2013

(54) ENHANCEMENT OF POWER SUPPLY REJECTION FOR OPERATIONAL AMPLIFIERS AND VOLTAGE REGULATORS

(75) Inventor: Uday Dasgupta, Singapore (SG)

(73) Assignee: MediaTek Singapore Pte. Ltd., Singapore (SG)

( * ) Notice: Subject to any disclaimer, the term of this patent is extended or adjusted under 35 U.S.C. 154(b) by 499 days.

(21) Appl. No.: 12/704,506

(22) Filed: Feb. 11, 2010

(65) Prior Publication Data

US 2011/0193540 A1 Aug. 11, 2011

(51) Int. Cl.
*G05F 1/565* (2006.01)
(52) U.S. Cl.
USPC ............................................ 323/280; 363/39
(58) Field of Classification Search .................. 323/273, 323/275, 278, 280, 281; 363/39
See application file for complete search history.

(56) References Cited

U.S. PATENT DOCUMENTS

| | | | |
|---|---|---|---|
| 6,559,623 B1* | 5/2003 | Pardoen | 323/274 |
| 7,907,003 B2* | 3/2011 | Pulijala et al. | 327/541 |
| 2007/0216381 A1* | 9/2007 | Tsuchiya et al. | 323/273 |

FOREIGN PATENT DOCUMENTS

CN 101464699 A * 6/2009

OTHER PUBLICATIONS

Mohamed El-Nozahi, Ahmed Amer, Joselyn Torres, Kamran Entesari and Edgar Sanchez-Sinencio, "A 25mA 0.13um CMOS LDO Regulator with Power-Supply Rejection Better Than-56dB up to 10MHz Using a Feedforward Ripple-Cancellation Technique," ISSCC Digest of Technical Papers, pp. 330-331, Feb. 2009. USA.

* cited by examiner

*Primary Examiner* — Harry Behm
(74) *Attorney, Agent, or Firm* — Winston Hsu; Scott Margo (57) ABSTRACT

A scheme for enhancement of the power-supply ripple rejection for operational amplifiers (op-amps) and low-dropout (LDO) voltage regulators is described. The scheme adds calculated amounts of current derived from the power-supply ripple with the input differential pair current to cancel off the output ripple, improving the high-frequency power-supply ripple rejection without requiring a substantial redesign of the circuitry involved.

16 Claims, 10 Drawing Sheets

ENHANCEMENT OF POWER SUPPLY REJECTION FOR OPERATIONAL AMPLIFIERS AND VOLTAGE REGULATORS

BACKGROUND OF THE INVENTION

1. Field of the Invention

The present invention relates to a scheme for enhancement of power supply ripple rejection, and in particular, to a circuit for enhancing the power supply ripple rejection for operational amplifiers (op-amps) and low-dropout (LDO) voltage regulators.

2. Description of the Prior Art

Power Supply Rejection Ratio (PSRR), a measure of power-supply ripple rejection, is an important parameter for op-amps and op-amp based LDOs. With many types of circuits running off the same power supply line $V_{DD}$, the DC voltage at $V_{DD}$ becomes corrupted with ripple voltage. The ripple voltage usually has a complex waveform having a frequency content from DC to several hundred kilohertz. For op-amp circuits to function properly, the op-amps concerned must be able to reject this unwanted ripple at the outputs up to as high frequency as possible. Alternatively, if an LDO regulator is used to clean-up this ripple, it must also be able to provide the same type of rejection. Ability to provide good rejection to power-supply ripple is indicated by a high PSRR figure (80 dB to 100 dB) for the circuit.

Figure 1:
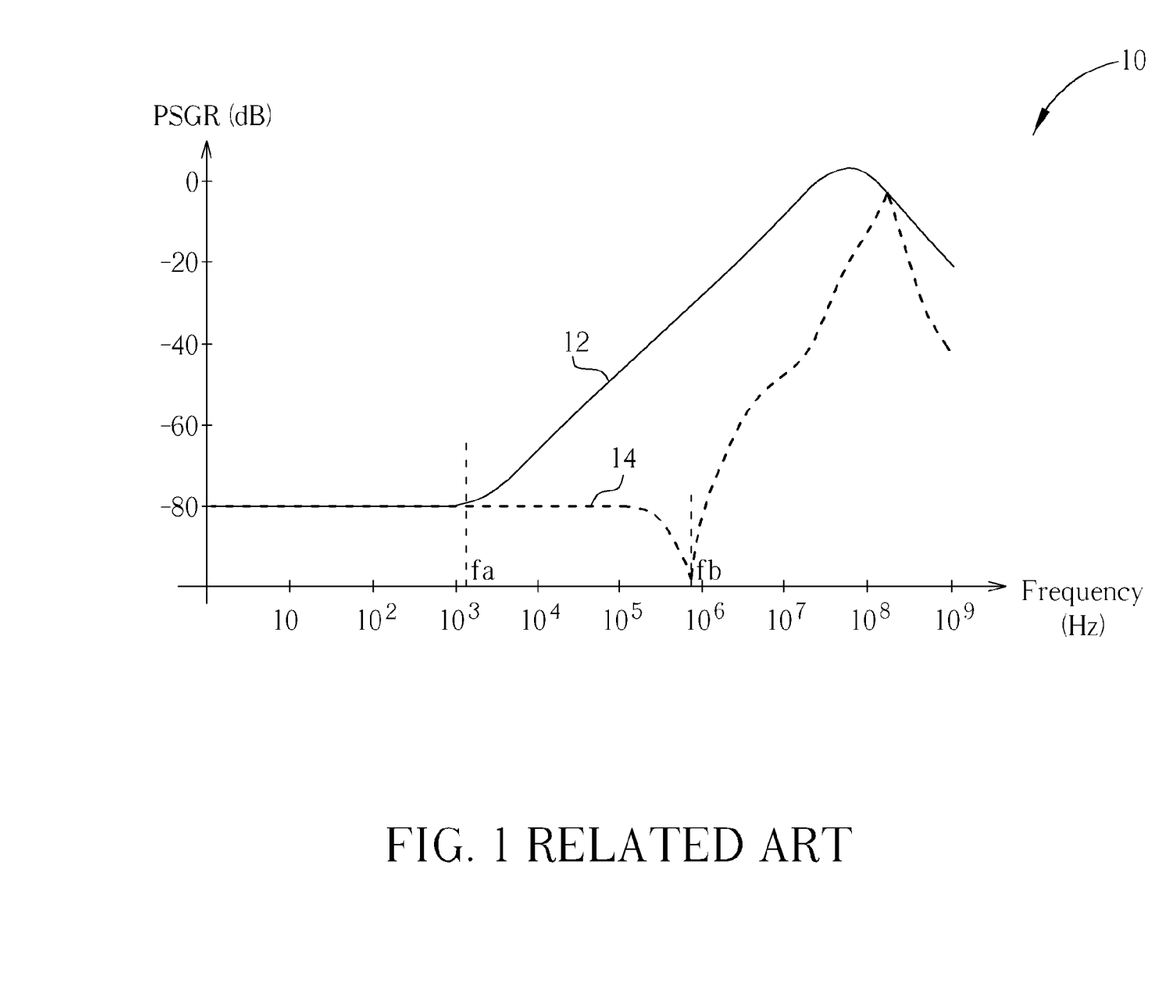
FIG. 1 is a frequency response diagram showing PSGR figures for op-amps and LDOs with and without enhancement.

As it turns out, it is more convenient to work with the inverse of PSRR instead and this inverse will be referred to as the Power Supply Gain Ratio (PSGR). Thus, PSGR in dB=negative of PSRR in dB. Usually, the PSGR for an op-amp or LDO is good (typically −80 dB) at low frequencies: from DC to a few kilohertz. After that, the PSGR degrades with frequency at a rate of 20 dB/decade. Thus, the high frequency PSGR figures are poor. Please refer to FIG. 1. FIG. 1 is a frequency response diagram 10 showing PSGR figures for op-amps and LDOs with and without enhancement. The poor high frequency PSGR figures of the related art are shown by the solid line curve 12 in FIG. 1. Thus, the objective is to use enhancement in order to have better PSGR figures at higher frequencies as shown by the dashed line curve 14 in FIG. 1.

The most appropriate related art is authored by Mohamed El-Nozahi, Ahmed Amer, Joselyn Torres, Kamran Entesari and Edgar Sanchez-Sinencio, entitled "A 25 mA 0.13 µm CMOS LDO Regulator with Power-Supply Rejection Better Than −56 dB up to 10 MHz Using a Feedforward Ripple-Cancellation Technique," and published in the ISSCC Digest of Technical Papers, pp. 330-331, on February 2009.

Figure 2:
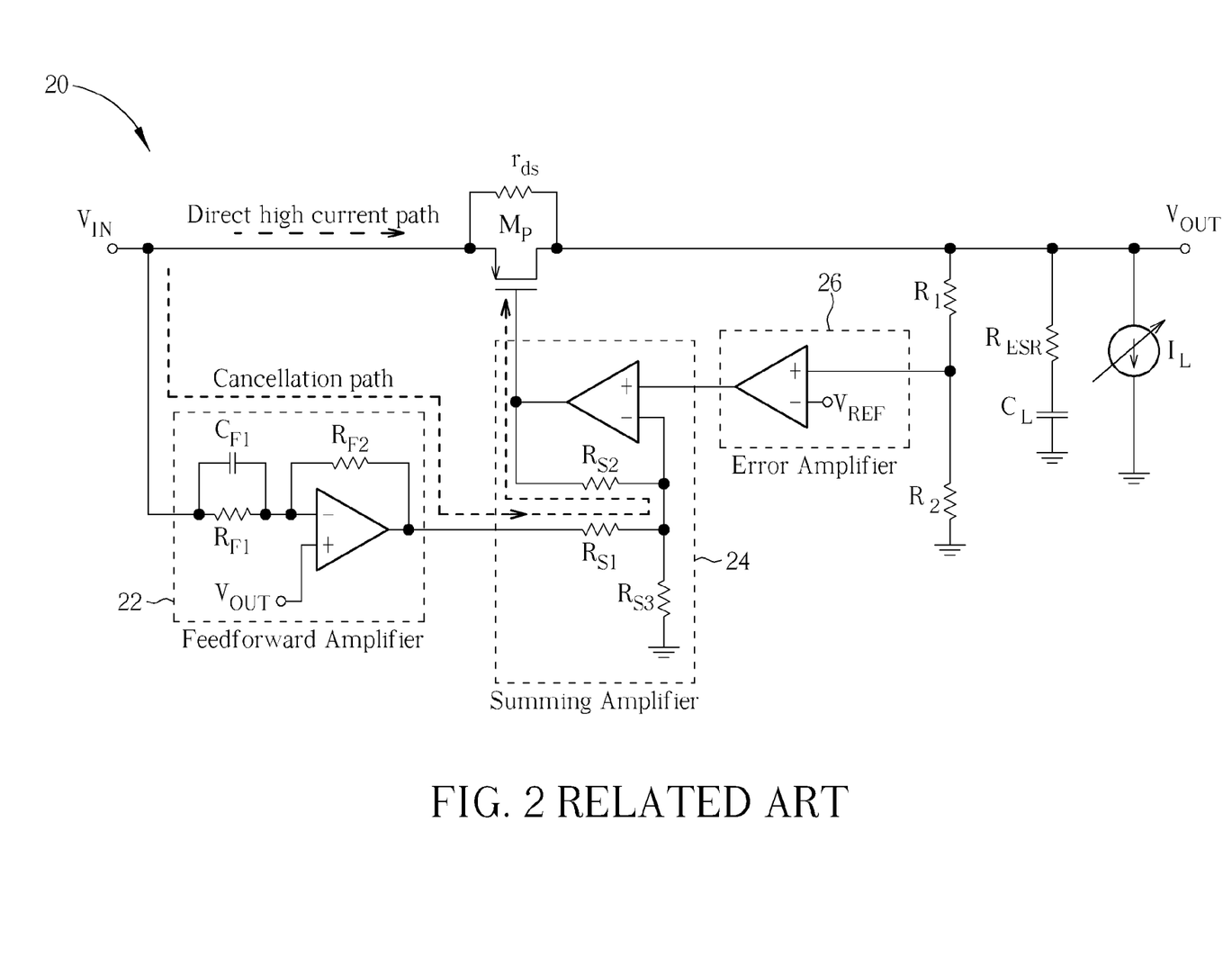
FIG. 2 shows a block-level representation of an LDO regulator employing a feedforward cancellation technique according to the related art.

Please refer to FIG. 2. FIG. 2 shows a block-level representation of an LDO regulator 20 employing a feedforward cancellation technique according to the related art. The LDO regulator 20 utilizes a feedforward amplifier 22 together with a summing amplifier 24 for producing a cancellation path leading into the gate of a pass transistor $M_P$. The output of error amplifier 26 is also input into the summing amplifier 24. Therefore, the technique described in the paper modifies the gate voltage of the pass transistor $M_P$ with power-supply ripple to achieve ripple cancellation at output $V_{OUT}$ for high frequencies. This related art circuit thus needs the LDO regulator 20 to be modified to include the summing amplifier 24 in order to perform addition of the error amplifier 26 output voltage with the power-supply ripple voltage to drive the gate of the pass transistor $M_P$. However, considerable effort is required to redesign the circuit in order to employ the summing amplifier 24, which limits the appeal of the related art LDO regulator 20. In addition, the circuit redesign may be different for different circuits, requiring a custom redesign to be performed in many cases.

SUMMARY OF THE INVENTION

According to one embodiment, an electronic circuit with enhanced power supply rejection includes a cancellation circuit having an input terminal receiving a reference signal and an output terminal generating a cancellation current. The electronic circuit also includes a regulator circuit having a differential pair of transistors outputting a differential current and a load coupled to the differential pair of transistors. The load has an input for receiving both the cancellation current and the differential current and an output outputting the sum of the cancellation current and the differential current. A pass transistor has an input terminal coupled to the output of the load and also includes an output terminal for generating an output current based on the sum of the cancellation current and the differential current.

According to another embodiment, an electronic circuit with enhanced power supply rejection includes a cancellation circuit having an input terminal receiving a reference signal and an output terminal generating a cancellation current comprising a first cancellation current and a second cancellation current. The electronic circuit also includes a regulator circuit having a load and a differential pair of transistors outputting a differential current comprising a first differential current and a second differential current. The load is coupled to the differential pair of transistors and has a first input for receiving the sum of the first cancellation current and the first differential current, a second input for receiving the sum of the second cancellation current and the second differential current, and a single output outputting the sum of currents received through the first and second inputs of the load, and the load adds the currents received through the first and second inputs of the load before outputting the sum of currents as a load output current. A pass transistor has an input terminal coupled to the output of the load and an output terminal for generating an output current based on the load output current.

These and other objectives of the present invention will no doubt become obvious to those of ordinary skill in the art after reading the following detailed description of the preferred embodiment that is illustrated in the various figures and drawings.

DETAILED DESCRIPTION

The circuitry described below achieves the same results of the related art disclosed in FIG. 2 above by adding a current derived from the power-supply ripple (using a capacitor) with the error amplifier differential pair output current. Since current addition requires no extra circuitry, essentially no modification of the op-amp or LDO is needed and the overall circuit is simpler. In other words, this invention can be applied to any op-amp or LDO design.

The principle underlying the proposed technique begins with a definition of the terms involved.

The PSGR of an op-amp or LDO is defined as:

$$PSGR(s) = \frac{P(s)}{A(s)} \quad (1)$$

Where, $P(s)$ is the power supply gain which again defined as:

$$P(s) = \frac{V_O(s)}{V_P(s)} \quad (2)$$

Where, $V_O(s)$ is the ripple voltage appearing at the output of the circuit when ripple voltage $V_P(s)$ is fed to the power supply terminal $V_{DD}$. The circuit is kept under open-loop condition without input signal.

Again, $A(s)$ in (1) is the signal gain which defined as usual as:

$$A(s) = \frac{V_O(s)}{V_I(s)} \quad (3)$$

Where, $V_O(s)$ is the signal voltage appearing at the output of the circuit when signal voltage $V_I(s)$ is applied at the inputs. The circuit again is kept under open-loop condition without ripple at $V_{DD}$.

In (1) to (3) above, 's' is the Laplace Transform frequency variable indicating that all the quantities are functions of frequency.

We will now take help of small signal analysis assuming the op-amp or LDO is a two-stage design. The small signal parameters are: $g_{m1}$=first-stage transconductance, $g_{m2}$=second-stage transconductance, $g_{m3}$=transconductance of compensating transistor in Ahuja compensation, $C_1$=parasitic capacitance loading first stage, $C_2$=total capacitance loading second stage, $r_1$=output resistance of first stage, $r_2$=output resistance of second stage or the net load resistance, $C_C$=compensation capacitance, $R_C$=compensation resistance in Miller compensation.

Case 1: Miller Compensation:

We can find by small-signal analysis and setting $R_C=1/g_{m2}$:

$$P(s) = \frac{s^2 C_1 C_2 r_1 r_2 + s C_C g_{m2} r_1 r_2 + 1}{D(s)} \quad (4)$$

and $$A(s) = \frac{g_{m1} g_{m2} r_1 r_2}{D(s)} \quad (5)$$

where $D(s)$ is a degree 3 polynomial in 's' with the coefficients determined by $C_1$, $C_2$, $C_C$, $R_1$, $R_2$, $R_C$ and $g_{m2}$ but not $g_{m1}$.

The PSGR is now given according to (1) (4) and (5) by:

$$PSGR(s) = \frac{s^2 C_1 C_2 r_1 r_2 + s C_C g_{m2} r_1 r_2 + 1}{g_{m1} g_{m2} r_1 r_2} \quad (6)$$

It can be seen from (6), neglecting the degree 2 term in 's', that the PSGR has a zero at $f_a=1/2\pi C_C g_{m2} r_1 r_2$ which happens to be the same as the dominant pole for the compensated frequency response and, therefore, is at a very low frequency. To improve the PRGR response, this zero needs to be shifted to a frequency as high as possible.

Now if a ripple cancellation current is obtained by dropping the ripple voltage $V_P(s)$ across a capacitor $C_X$ and is added with the input differential pair (transconductance $g_{m1}$) current, then (5) can be used to find the contribution of this cancellation current at the output of the circuit by replacing $g_{m1}$ by $sC_X$, the transconductance of $C_X$. The cancellation current is added in such a manner that it opposes the power-supply ripple normally appearing at the output and thus (4) modifies to:

$$P(s) = \frac{s^2 C_1 C_2 r_1 r_2 + s C_C g_{m2} r_1 r_2 + 1}{D(s)} - \frac{s C_X g_{m2} r_1 r_2}{D(s)} \quad (4a)$$

$$= \frac{s^2 C_1 C_2 r_1 r_2 + s(C_C - C_X) g_{m2} r_1 r_2 + 1}{D(s)}$$

Using (4a), (5) and (1), and choosing $C_X=C_C$, the PSGR now is given by:

$$PSGR(s) = \frac{s^2 C_1 C_2 r_1 r_2 + 1}{g_{m1} g_{m2} r_1 r_2} \quad (7)$$

Comparing (7) with (6), it is seen that we have been able to totally eliminate that low-frequency zero $f_a$ by shifting it to infinity. This improves the high-frequency PSGR. However the degree 2 term in 's' remains, forming transmission zero, and this will result in the PSGR dipping before rising at a frequency $f_b=1/2\pi\sqrt{C_1 C_2 r_1 r_2}$ as shown by the dashed curve in FIG. 1. Normally, $f_b$ is a high enough frequency—several decades higher than $f_a$. The rise in PSGR beyond $f_b$ is due to terms with higher degree in 's' in the numerator of (7) resulting from parasitic capacitances which this theory fails to account for.

Case 2: Ahuja Compensation:
As before, it can be found through small-signal analysis:

$$P(s) = \frac{\left(s\frac{C_C}{g_{m3}}+1\right)(sC_1r_1+1)}{D(s)} \quad (8)$$

and $$A(s) = \frac{g_{m1}g_{m2}r_1r_2\left(s\frac{C_c}{g_{m3}}+1\right)}{D(s)} \quad (9)$$

and $$PSGR(s) = \frac{(sC_1r_1+1)}{g_{m1}g_{m2}r_1r_2} \quad (10)$$

In this case the zero of PSGR at $f_a=1/2\pi C_1 r_1$ is higher than the dominant pole frequency but is not sufficiently high. Here too, D(s) is independent of $g_{m1}$. Therefore (8) can be modified as before by using a cancellation current generated by dropping the ripple voltage across a capacitor $C_X$ to:

$$P(s) = \frac{\left(s\frac{C_C}{g_{m3}}+1\right)(sC_1r_1+1)}{D(s)} - \frac{sC_X g_{m2}r_1r_2\left(s\frac{C_c}{g_{m3}}+1\right)}{D(s)} \quad (8a)$$

$$= \frac{[s(C_1-g_{m2}r_2C_X)r_1+1]\left(s\frac{C_c}{g_{m3}}+1\right)}{D(s)}$$

Choosing $C_1 = g_{m2}r_2C_X$, we can arrive at the new PSGR expression using (8a), (9) and (1):

$$PSGR(s) = \frac{1}{g_{m1}g_{m2}r_1r_2} \quad (11)$$

As can be seen in (11) the zero $f_a$ for the PSGR has been totally eliminated. However, $f_b$ as in FIG. 1 (dashed curve) in this case will be given by any degree 2 term in 's' due to parasitic capacitances missed out by the theory, and not represented in any of the above equations.

It can be noted that $g_{m2}r_2$ is the DC gain of the second stage. We need to have $C_X = C_1/g_{m2}r_2$ for ripple cancellation. Thus, it will be more convenient to use Ahuja compensation where the DC gain of the second stage is fixed. However, Miller compensation needs $C_X = C_C$ and there is no such restriction. However, $f_b$ most likely will be higher for Ahuja compensation compared to Miller.

Figure 3:
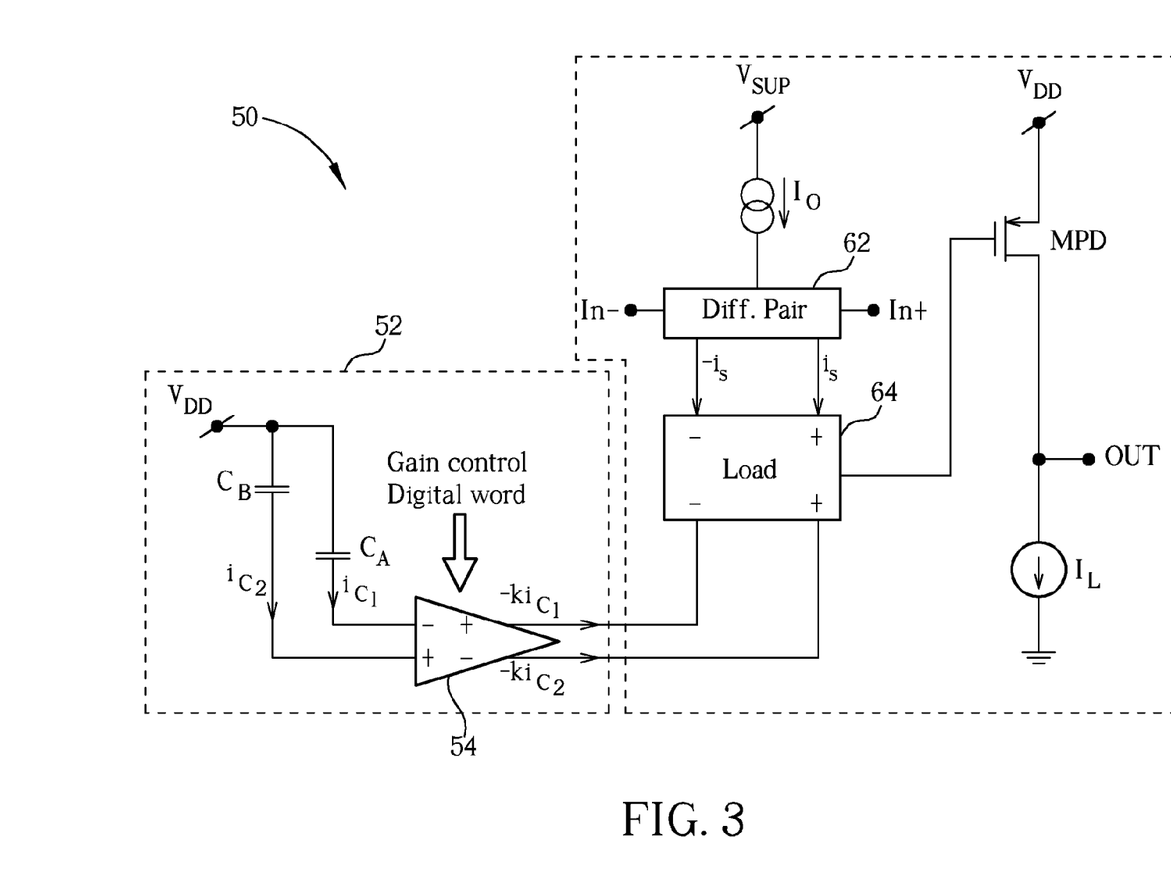
FIG. 3 shows a block-level implementation of a circuit for achieving PSRR Enhancement for op-amps and LDOs according to a first embodiment.
Figure 4:
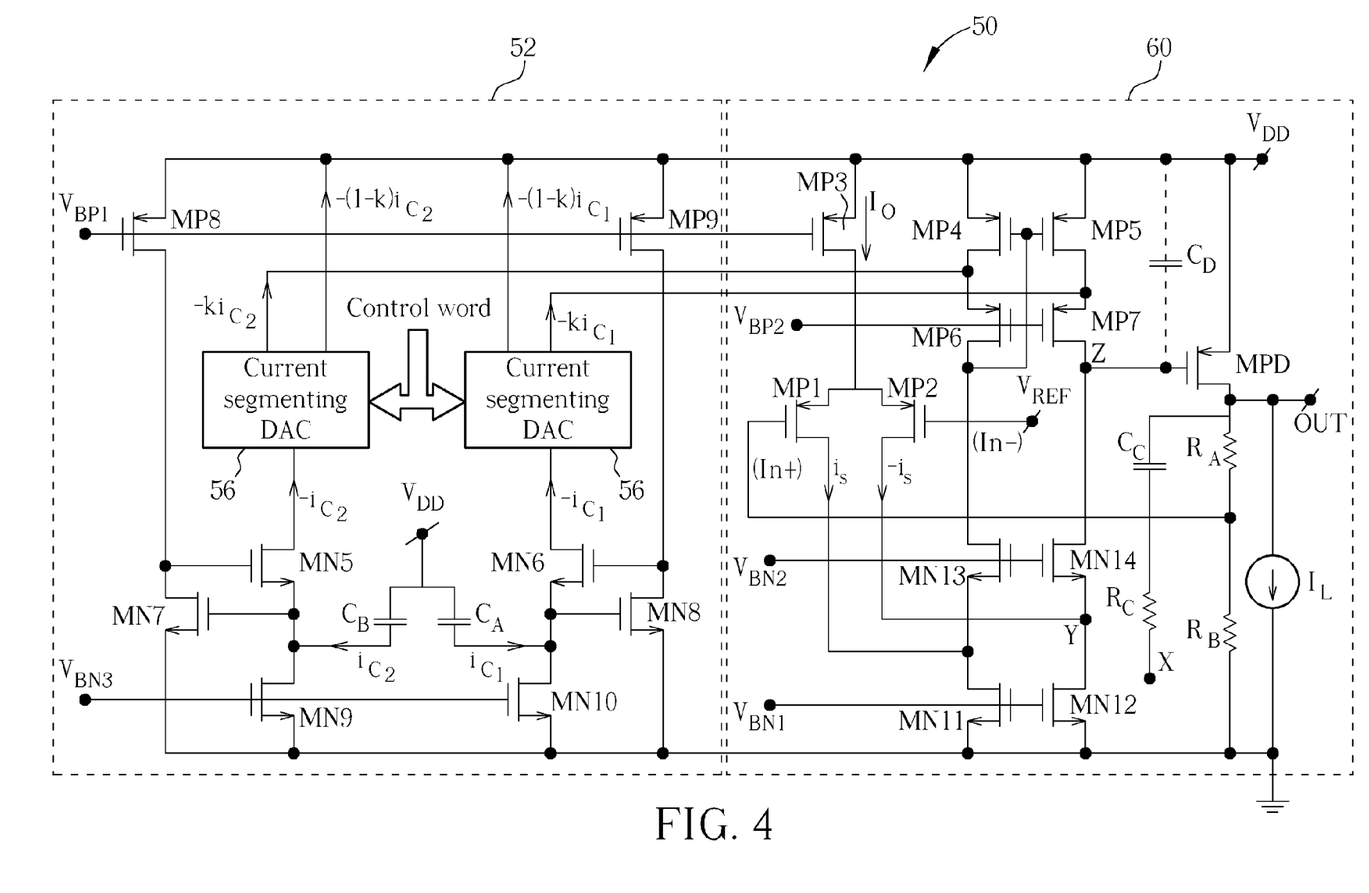
FIG. 4 shows a transistor-level implementation for the circuit shown in FIG. 3.

Please refer to FIG. 3 and FIG. 4. FIG. 3 shows a block-level implementation of a circuit 50 for achieving PSRR Enhancement for op-amps and LDOs according to a first embodiment, and FIG. 4 shows the transistor-level implementation for the same. In FIG. 3, a differential pair 62, a load 64, an output driving pass transistor MPD, and a current source $I_L$ constitute a 2-stage op-amp 60. $V_{SUP}$ for the tail current source $I_0$ is $V_{DD}$ for P-type differential pair transistors and GND for N-type. In FIG. 4, this op-amp 60 is shown configured as a LDO regulator. The differential pair 62 is formed by $MP_1$, $MP_2$ and the load 64 is formed by $MP_4$ to $MP_7$ and $MN_{11}$ to $MN_{14}$. If Miller compensation is desired, node X is connected to node Z and if Ahuja compensation is desired, node X is connected to node Y with a resistance of $R_C=0$. $V_{REF}$ is a reference voltage for the regulator which is compared with a fraction of the regulated voltage OUT generated by $R_A$ and $R_B$. $I_L$ is the load current.

FIG. 3 also shows a cancellation circuit 52 having a differential current amplifier 54 with gain control for producing cancellation current. The differential current amplifier 54 is a current input/current output inverting amplifier with its gain k variable (0<k<1) by a digital control word. In other embodiments, the differential current amplifier 54 having gain control could instead be replaced with a differential current amplifier having a fixed gain. Capacitors $C_A$ and $C_B$ are connected to the two inputs of this differential current amplifier 54. The other ends of $C_A$ and $C_B$ are returned to power-supply terminal $V_{DD}$. In other embodiments, capacitors with variable capacitances may be substituted for capacitors $C_A$ or $C_B$. Thus, it may be possible to substitute capacitors with fixed or variable capacitance and/or current amplifiers with fixed or adjustable gain, as one skilled in the art will readily appreciate.

Regulated cascode stages $MN_5$, $MN_7$, $MN_9$, $MP_8$ and $MN_6$, $MN_8$, $MN_{10}$, $MP_9$ form the input circuitry for the differential current amplifier 54, as shown in FIG. 4. They offer a very low input impedance to $C_A$ and $C_B$ and, therefore, the ripple voltage $v_{rip}$ on $V_{DD}$ is converted to currents $i_{c1}=sC_A v_{rip}$ and $i_{c2}=sC_B v_{rip}$ by the transconductances of the capacitors. These currents are scaled by a factor k using a pair of identical Current Segmenting digital-to-analog converters (DAC) 56 shown in FIG. 4. This is equivalent to scaling the capacitors $C_A$ and $C_B$ by a factor k. The value of k is determined by the control word input to the differential current amplifier 54. The output currents $-ki_{c1}$ and $-ki_{c2}$ are then added to signal currents $+/-i_s$ from the differential pair 62 at the load 64. The two pairs of currents are applied at different nodes of the load 64, but eventually they add up at the single-ended output of the load 64.

FIG. 3 shows with what polarity the currents $-ki_{c1}$ and $-ki_{c2}$ are to be applied to the load 64. The +/− signs on the load 64 indicate that with increasing current in the '+' node the output of the load 64, connected to the gate of MPD, goes high. The effect will be the same with decreasing current in the "−" node. Therefore, it is easy to see that as the ripple voltage $v_{rip}$ makes $V_{DD}$ as well as the source of MPD go high, the currents $i_{c1}$, $i_{c2}$ increase whereas, $-ki_{c1}$ and $-ki_{c2}$ reduce. Consequently, if $ki_{c1}>ki_{c2}$ or, in other words, $C_A>C_B$, the gate of MPD also goes high. Furthermore, according to the theory above, if we have $$k(C_A-C_B)=C_X, \quad (12)$$

where $C_X=C_C$ for Miller compensation (13)
and $C_X=C_1/g_{m2}r_2$ for Ahuja compensation (14)
the change in $V_{GS}$ for MPD with $v_{rip}$ will be zero and the desired ripple cancellation will be obtained.

The scaling k provides means for accurate adjustment of $(C_A-C_B)$ to obtain maximum ripple rejection in practice. It is to be noted that it is also possible to have $C_B=0$ with $C_A=C_X$. When using Ahuja compensation, an additional capacitance $C_D$ may be used between gate and source of MPD to obtain a realizable value of $C_X$ if the second stage gain $g_{m2}r_2$ is large. This can be understood from (14) as $C_1$, essentially the gate-source capacitance of MPD, is now added to $C_D$.

Figure 5:
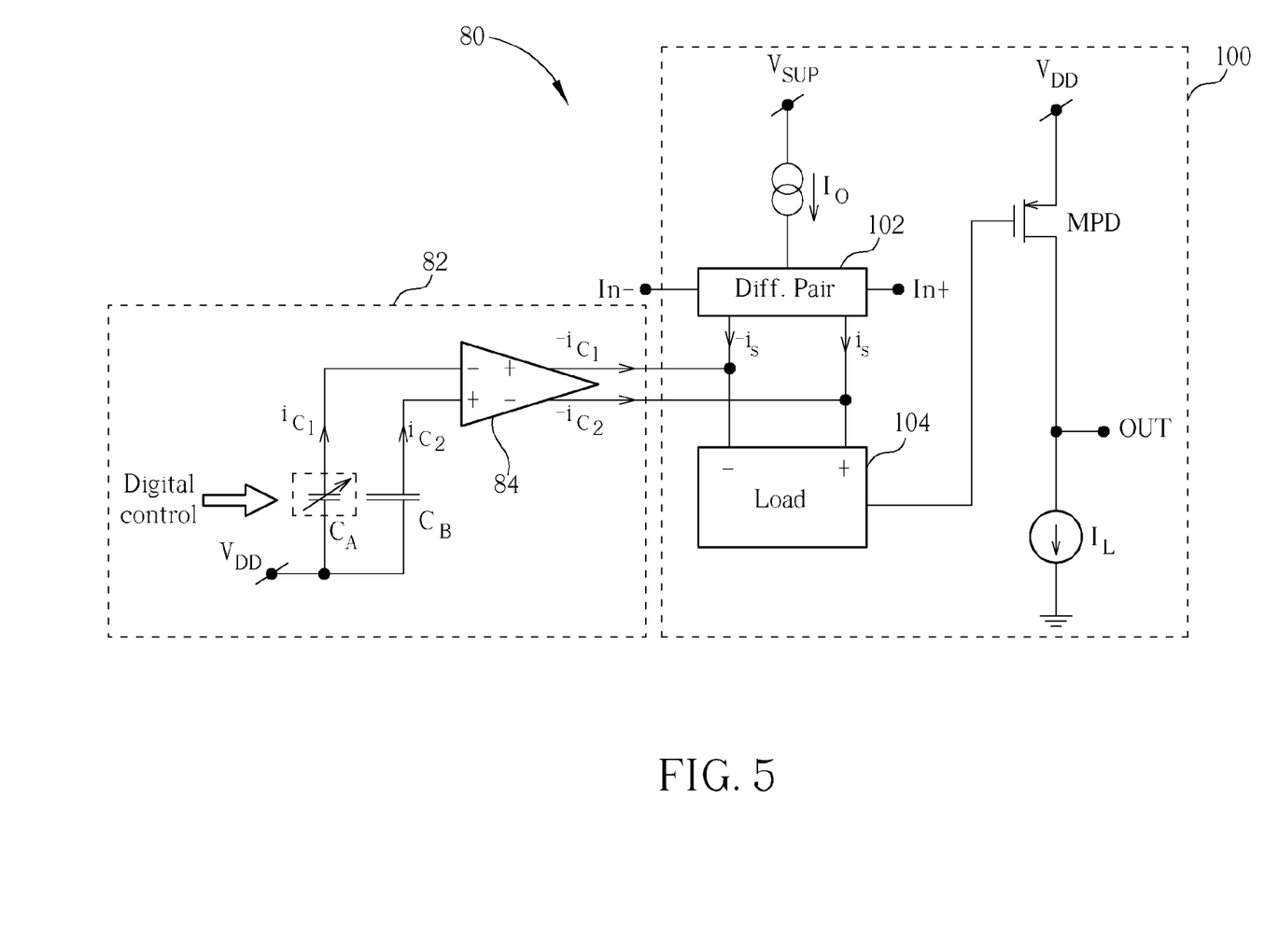
FIG. 5 shows the block-level implementation of a circuit for achieving PSRR Enhancement for op-amps and LDOs according to a second embodiment.
Figure 6:
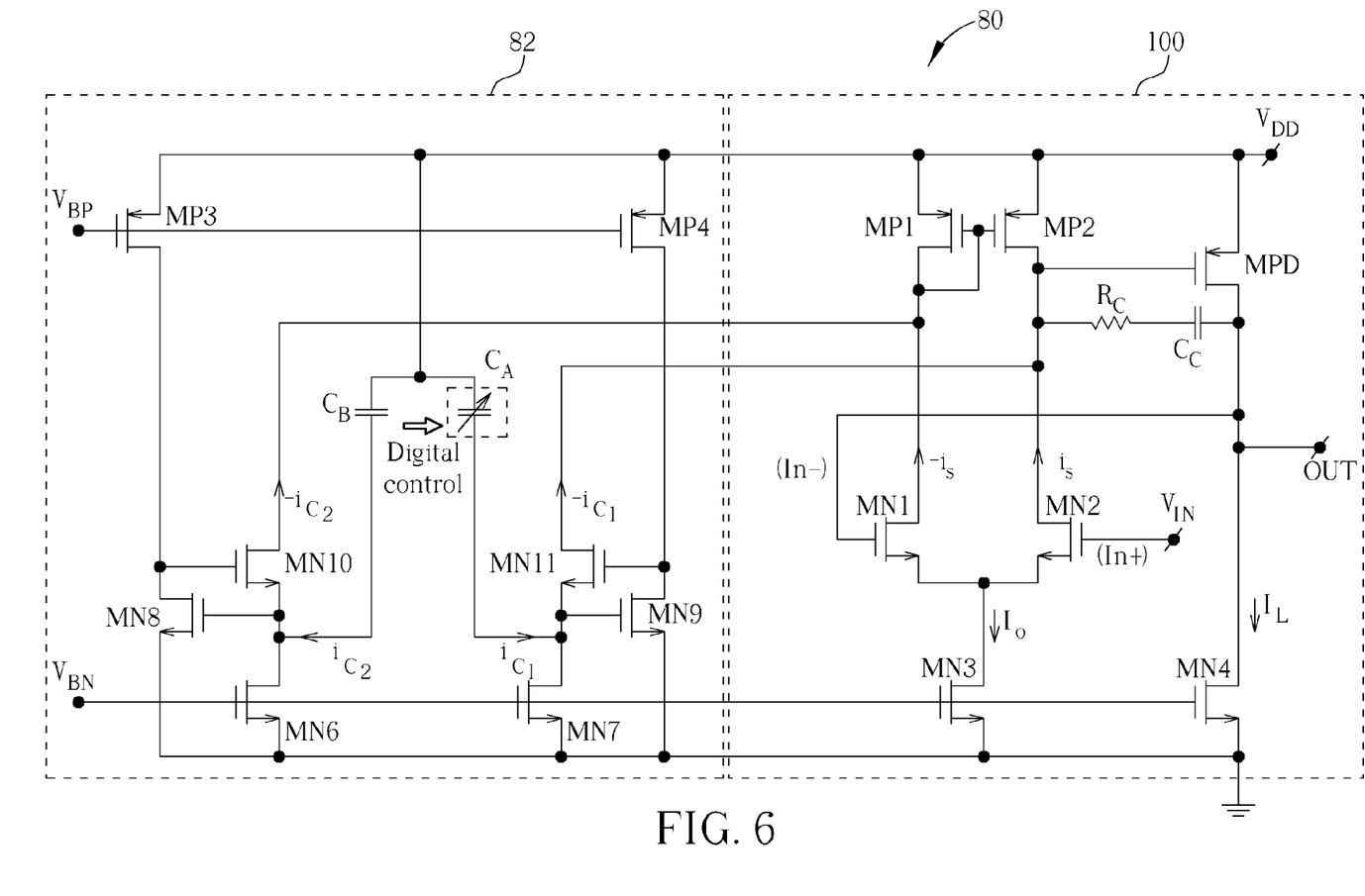
FIG. 6 shows the transistor-level implementation for the circuit shown in FIG. 5.

Please refer to FIG. 5 and FIG. 6. FIG. 5 shows the block-level implementation of a circuit 80 for achieving PSRR Enhancement for op-amps and LDOs according to a second embodiment, and FIG. 6 shows the transistor-level implementation of the same. The gain of a current amplifier 84 in cancellation circuit 82 is fixed (to unity here) and capacitance of capacitor $C_A$ is adjusted digitally using a digital control word. This gives the same effect as changing the gain of the current amplifier 84. In other embodiments, the current amplifier 84 having a fixed gain could be replaced with a differential current amplifier with gain control, similar to the differential current amplifier 54 shown in FIG. 3. It may be possible to substitute capacitors with fixed or variable capacitance and/or current amplifiers with fixed or adjustable gain, as one skilled in the art will readily appreciate.

The outputs from the current amplifier 84 $-i_{c1}$ and $-i_{c2}$ are now added directly with the output current $+/-i_s$ of a differential pair 102 of op-amp 80, where op-amp 80 operates in buffer mode. The sum of the currents $-i_{c1}$ and $-i_{c2}$ and $+/-i_s$ is received by load 104, and the sum of the resulting differential signal is converted to a single-ended one by the load 104 to drive the gate of the output pass transistor MPD. Requirements for applying $-i_{c1}$, $-i_{c2}$ to the load 104 with the correct polarity remain the same as before. The compensation shown in FIG. 6 is Miller compensation.

Several other embodiments may be possible by combining the features of the first embodiment illustrated in FIG. 3 and FIG. 4 and the second embodiment illustrated in FIG. 5 and FIG. 6.

Figure 7:
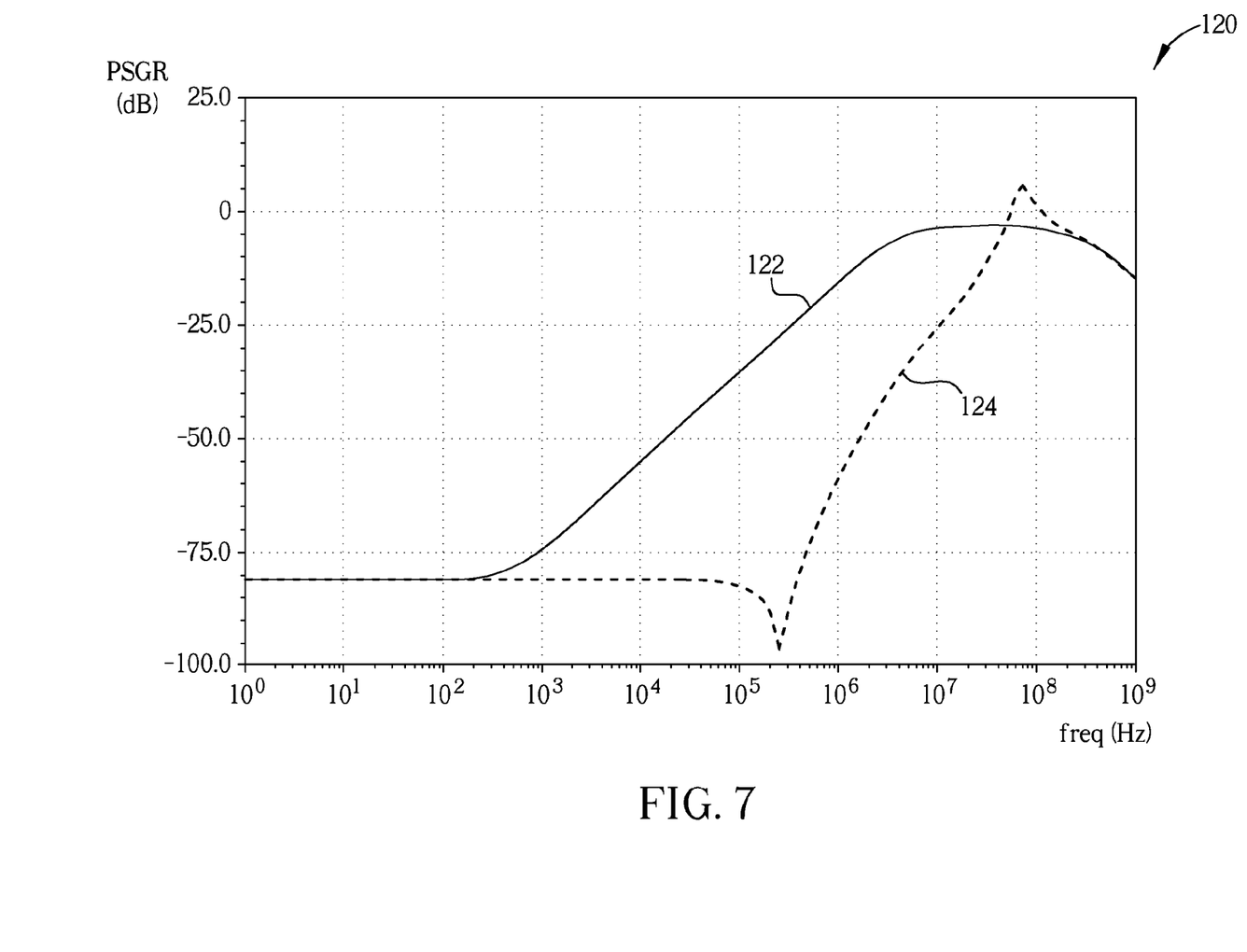
FIG. 7 is a frequency response diagram showing PSGR figures calculated in simulation results for the circuit in FIG. 4 using Miller compensation as compared with related art simulation results.

Please refer to FIG. 7. FIG. 7 is a frequency response diagram 120 showing PSGR figures calculated in simulation results for the circuit in FIG. 4 using Miller compensation as compared with related art simulation results. Curve 124 shows simulation results of the circuit shown in FIG. 4, which uses cancellation by adding the currents together at the load 64. Curve 122 shows simulation results of circuitry that does not use cancellation.

Figure 8:
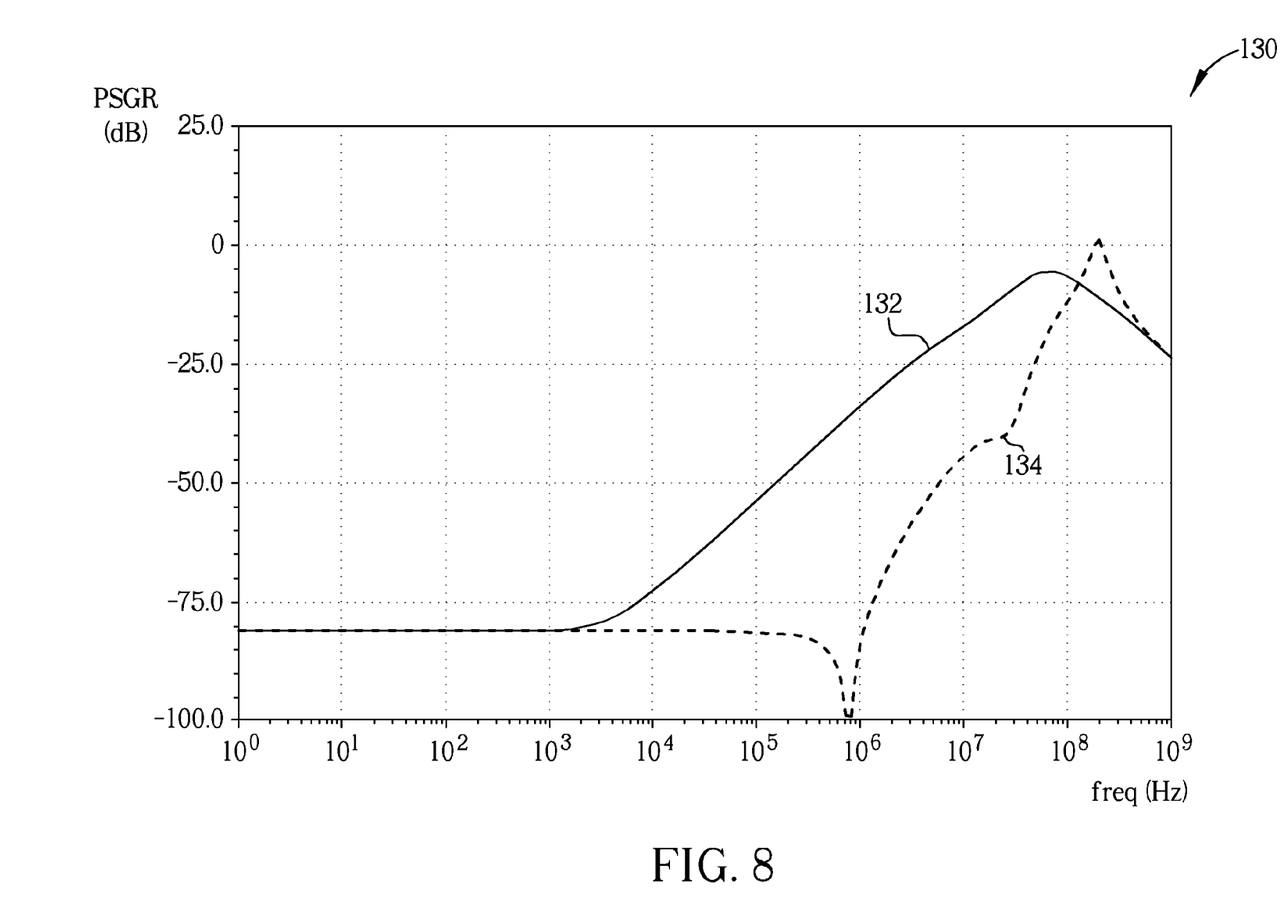
FIG. 8 is a frequency response diagram showing PSGR figures calculated in simulation results for the circuit in FIG. 4 using Ahuja compensation as compared with related art simulation results.

Please refer to FIG. 8. FIG. 8 is a frequency response diagram 130 showing PSGR figures calculated in simulation results for the circuit in FIG. 4 using Ahuja compensation as compared with related art simulation results. Curve 134 shows simulation results of the circuit shown in FIG. 4, which uses cancellation by adding the currents together at the load 64. Curve 132 shows simulation results of circuitry that does not use cancellation.

The schemes for power-supply ripple cancellation described above in FIG. 4 and FIG. 6 assume that any deviation from accurate cancellation due to process, temperature and load current changes will be checked by continuous calibration using a digital control word. However, a simpler way to maintain reasonably good cancellation is to track and take into account all the root causes of the deviations. Therefore, the paragraphs below will discuss this idea as applied to an LDO design. Firstly, we need to look into the expression for $C_X$ more closely.

For Miller compensation, a more accurate expression for $C_X$ is:

$$C_X = C_C + \frac{C_C}{g_{m2}r_2} + \frac{C_1}{g_{m2}r_2} + \frac{C_C}{g_{m2}r_1} \quad (15)$$

For an op-amp driving capacitive load, $g_{m2}r_2$ and $g_{m2}r_1$ are very large, so (13) is valid. But for an LDO, the second stage gain $g_{m2}r_2$ may be quite small, while $g_{m2}r_1$ very large, therefore (15) can be written as:

$$C_X = C_C + \frac{C_1 + C_C}{g_{m2}r_2} \quad (16)$$

Whereas, for Ahuja compensation, (14) is already a reasonably accurate expression for an LDO.

Now, the second stage gain $g_{m2}r_2$ is process, temperature and load current dependent. Therefore, according to (14) and (16), we need to track changes in $g_{m2}r_2$ and adjust $C_X$ accordingly.

Miller Compensation:

Firstly, we'll modify (16) for the purpose of easier tracking of the second-stage gain changes. We know that for any transistor including the pass transistor MPD (with transconductance $g_{m2}$) for an LDO with load resistance $r_2$, load current $I_L$ and output voltage $V_O$:

$$g_{m2}C_{Dsat} = 2I_L \quad (17)$$

$$\text{and } V_O = I_L r_2 \quad (18)$$

Where, $V_{Dsat}$ is the overdrive voltage for the pass-transistor. Using (17) and (18) we can modify (16) to:

$$C_X = C_C + \frac{V_{Dsat}}{2V_O}(C_1 + C_C) \quad (19)$$

If $V_{GS}$ is the magnitude of gate-source voltage and $V_{TH}$ the threshold voltage of MPD, then:

$$V_{Dsat} = V_{GS} - V_{TH} \quad (20)$$

Using (20) in (19) we have the final expression as:

$$C_X = C_C + \frac{V_{GS} - V_{TH}}{2V_O}(C_1 + C_C) \quad (21)$$

Now, (21) is the version of (16) with easily measurable quantities.

Ahuja Compensation:

In a similar way, (14) can be re-written as:

$$C_X = \frac{V_{GS} - V_{TH}}{2V_O} C_1 \quad (22)$$

Thus (22) is the equivalent of (21) for Ahuja compensation.

Figure 9:
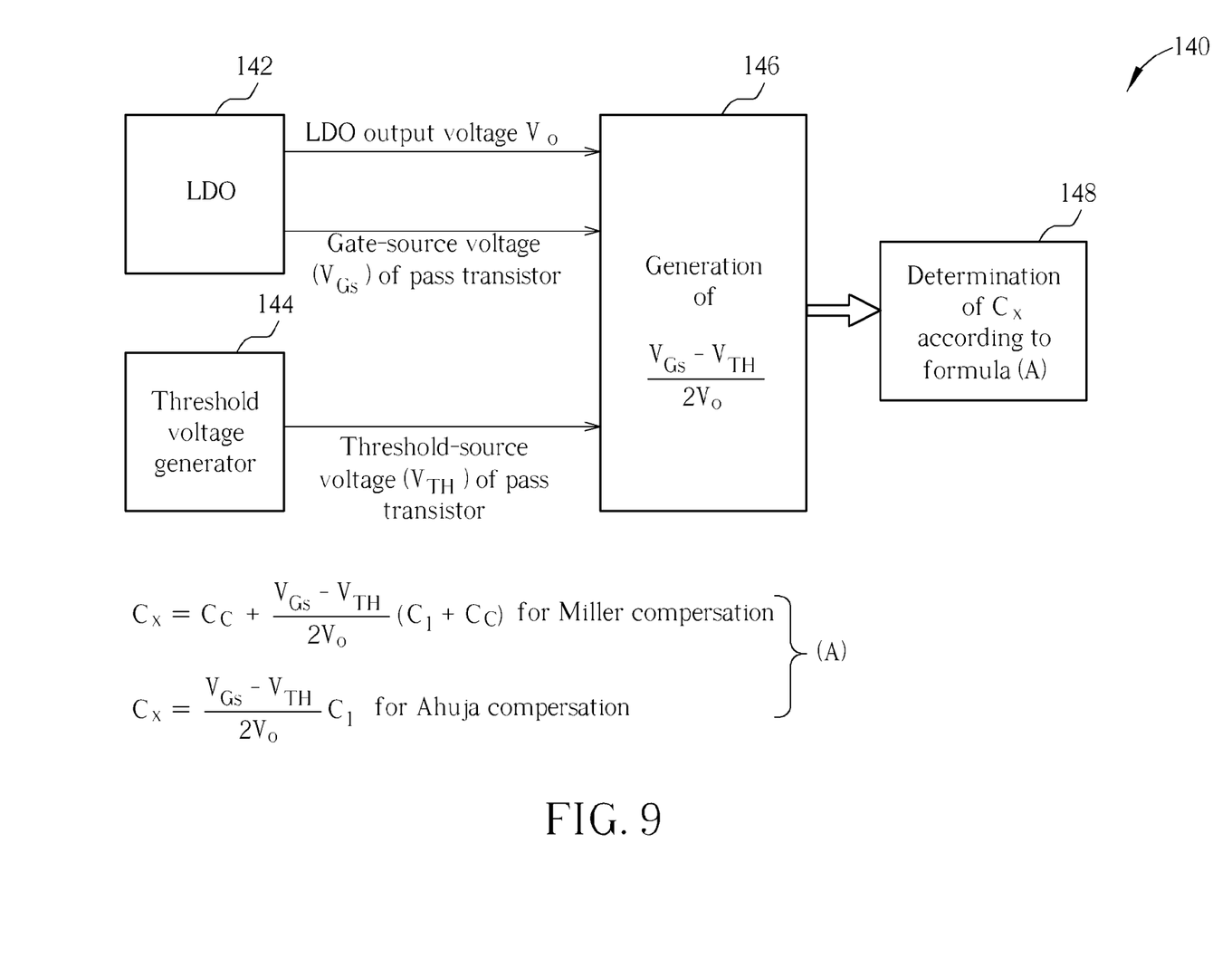
FIG. 9 shows a block diagram illustrating how to determine $C_X$ so that the ripple cancellation is process, temperature and load current independent.

Please refer to FIG. 9. FIG. 9 shows a block diagram 140 illustrating how $C_X$ has to be determined according to (21) or (22) so that the ripple cancellation is process, temperature and load current independent. Note that a different equation is needed for calculating $C_X$, depending on whether Miller compensation or Ahuja compensation is used. In block diagram 140, an LDO 142 provides LDO output voltage $V_O$ and gate-source voltage $V_{GS}$ of the pass transistor. A threshold voltage generator 144 provides the threshold voltage $V_{TH}$ of the pass transistor. All of these values are used for generating the quantity $$\frac{V_{GS} - V_{TH}}{2V_O}$$

in block 146, and this quantity is used in block 148 for determining the value of $C_X$ according to the appropriate formula (A).

Figure 10:
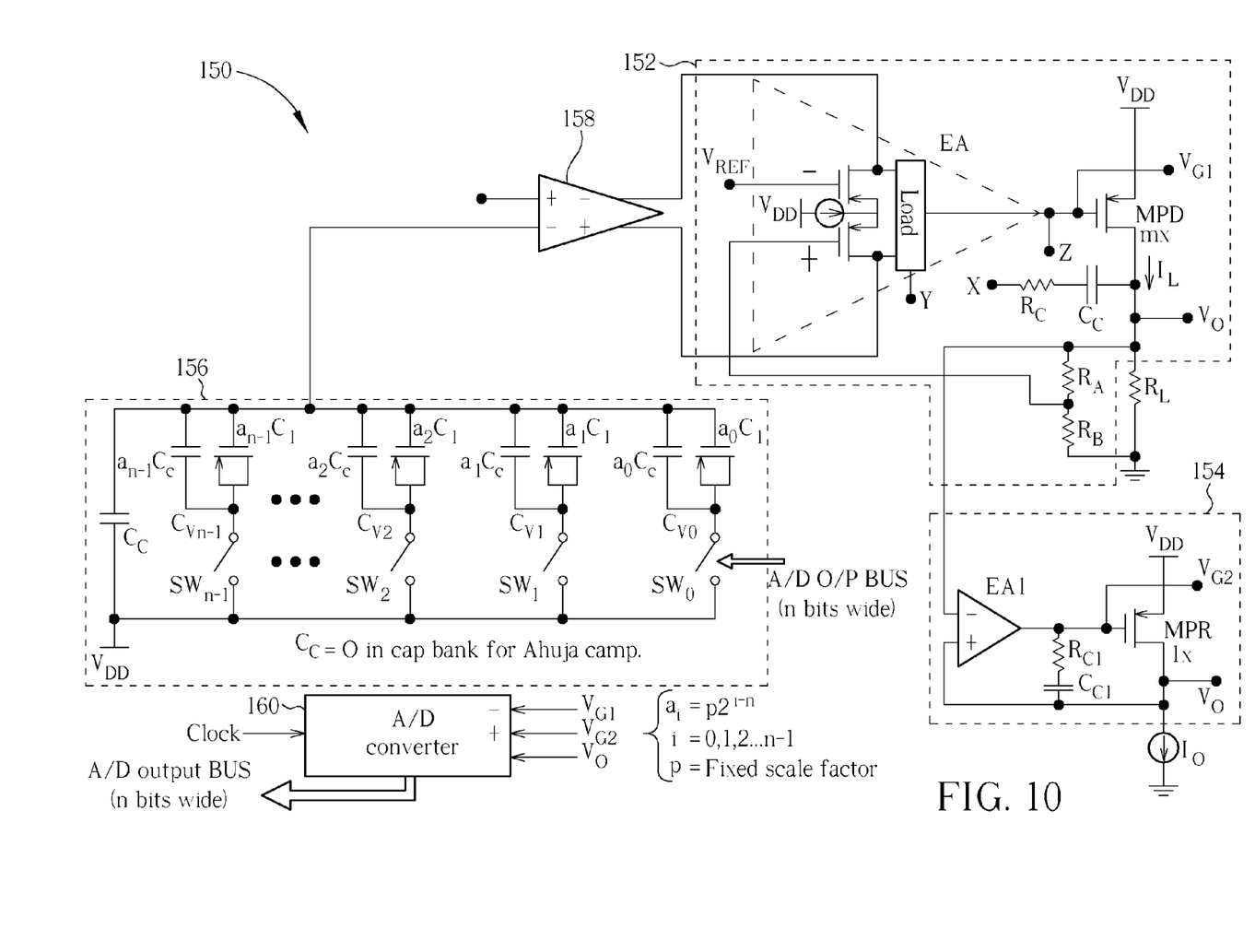
FIG. 10 is a circuit showing one implementation of the block diagram shown in FIG. 9 for achieving PSRR Enhancement for op-amps and LDOs according to a third embodiment which provides accurate ripple cancellation without the need of continuous calibration for Miller compensation.

Please refer to FIG. 10. FIG. 10 is a circuit 150 showing one implementation of the block diagram shown in FIG. 9 for achieving PSRR Enhancement for op-amps and LDOs according to a third embodiment which provides accurate ripple cancellation without the need of continuous calibration for Miller compensation. In FIG. 10, when Miller compensation is used, node X is connected to node Z in a main LDO 152. Here reference input $V_{REF}$, main error amplifier EA, MPD, $R_A$, $R_B$, $R_C$ and $C_C$ constitute the main LDO 152. $R_L$ is the load resistance and $R_C$, $C_C$ the compensation components. Again, reference input $V_O$, auxiliary error amplifier EA1, MPR, $R_{C1}$ and $C_{C1}$ constitute an auxiliary LDO 154 carrying a small current $I_O$. MPD is constructed out of several units of MPR and so they are unit-matched. According to the connectivity shown, both the main LDO 152 and the auxiliary LDO 154 have the same output voltage of $V_O$. Since MPD and MPR are unit-matched and they have the same drain-source voltage $|V_{DS}|=V_{DD}-V_O$, their threshold voltages $V_{TH}$ must be the same. Now $I_o$ and the aspect ratio of MPR is chosen such that MPR is just on the verge of weak inversion so that the gate-source voltage of MPR is $|V_{GS\_MPR}|=V_{TH}$. Also let us denote $|V_{GS\_MPD}|=V_{GS}$. Then the difference of the gate voltages of MPD and MPR=$V_{G2}-V_{G1}=(V_{DD}-|V_{GS\_MPR}|)-(V_{DD}-|V_{GS\_MPD}|)=|V_{GS\_MPD}|-|V_{GS\_MPR}|=V_{GS}-V_{TH}$.

An A/D converter 160 is used to convert $V_{G2}-V_{G1}=V_{GS}-V_{TH}$ with a voltage reference $2pV_O$. The scale factor 'p' is chosen such that $2pV_O$=max. value of $V_{GS}-V_{TH}$. Then we can say an A/D output of the A/D converter 160 is a number proportional to $(V_{GS}-V_{TH})/2V_O$. The A/D converter 160 can be any Nyquist type converter accepting differential inputs. The output bus of the A/D converter 160 is used to connect/disconnect capacitors in a capacitor bank 156 with the help of switches $S_{W0}$ to $S_{Wn-1}$.

Equation (23) below is derived from (21) and shows how $C_X$ is expressed after n-bit A/D conversion $$C_X = C_C + \frac{V_{GS} - V_{TH}}{2V_O}(C_1 + C_C) \qquad (23)$$
$$= C_C + \frac{V_{GS} - V_{TH}}{2pV_O}(pC_1 + pC_C)$$
$$\cong C_C + (b_{n-1}2^{-1} + b_{n-2}2^{-2} + b_{n-3}2^{-3} + \ldots + b_0 2^{-n})$$
$$(pC_1 + pC_C)$$
$$= C_C + (b_{n-1}a_{n-1} + b_{n-2}a_{n-2} + b_{n-3}a_{n-3} + \ldots + b_0 a_0)$$
$$(C_1 + C_C)$$

where $a_i = p2^{i-n}$ and $b_i$ are bit values = 0 or 1,
$i = 0, 1, 2, \ldots, n-1$ The capacitor bank 156 is designed to implement $C_X$ as in (23). There is one fixed capacitor equal to the compensation capacitor $C_C$ and the rest, implementing the variable part of $C_X$, are switched in and out with $S_{W0}$ to $S_{Wn-1}$. If $b_i=1$, $S_{Wi}$ is closed otherwise open. We know that $C_C$ is a MOM/PIP capacitor whereas $C_1$ is essentially the gate-source capacitor of MPD. Thus the switched capacitor $C_{vi}$, $i=0, 1, 2, \ldots, n-1$ is implemented with a parallel combination of a MOM/PIP capacitor $a_iC_C$ matching $C_C$ and a PMOS capacitor $a_iC_1$ matching MPD.

A current amplifier 158 feeding the load of EA with ripple cancellation current is a unity gain current amplifier and the capacitor bank is connected to only one of its input terminals. The other input terminal is not used.

When Ahuja compensation is used, node X is connected to node Y and $R_C=0$ in the main LDO 152. Using the implementation in FIG. 10, we can show in a similar manner that (22) converts to:

$$C_X \cong (b_{n-1}a_{n-1} + b_{n-2}a_{n-2} + b_{n-3}a_{n-3} + \ldots + b_0 a_0)C_1 \qquad (24)$$

where $a_i=p2^{i-n}$ and $b_i$ are bit values=0 or 1, $i=0, 1, 2, \ldots, n-1$

Therefore, according to (24), we just need to set $C_C=0$ in the capacitor bank 156 of FIG. 10.

In summary, the embodiments above all sum differential current output from a differential pair of transistors with cancellation current and output this summed current from the load. The summed current from the load is fed into a pass transistor for generating an output current. A substantial advantage is realized in no significant circuit redesign is required for implementing this change. No modification of the LDO or the op-amp is required, and no extra summing amplifier is needed either. Thus, the benefits of ripple cancellation can be realized with minimal cost and time needed.

Those skilled in the art will readily observe that numerous modifications and alterations of the device and method may be made while retaining the teachings of the invention.

What is claimed is:

1. An electronic circuit with enhanced power supply rejection, the electronic circuit comprising:
    a cancellation circuit comprising:
        an input terminal receiving a reference signal;
        a first capacitor directly coupled to the input terminal for receiving the reference signal and generating a first input current;
        a second capacitor directly coupled to the input terminal for receiving the reference signal and generating a second input current; and
        a differential current amplifier comprising:
            a first input for receiving the first input current from the first capacitor;
            a second input for receiving the second input current from the second capacitor;
            a first output for outputting a first output current; and
            a second output for outputting a second output current; and
        an output terminal generating a cancellation current comprising the first output current and the second output current; and
    a regulator circuit comprising:
        a differential pair of transistors outputting a differential current;
        a load coupled to the differential pair of transistors, the load comprising:
            a first input receiving the cancellation current;
            a second input receiving the differential current; and
            an output outputting the sum of the cancellation current and the differential current; and
        a pass transistor having an input terminal coupled to the output of the load and an output terminal for generating an output current based on the sum of the cancellation current and the differential current.

2. The electronic circuit of claim 1, wherein the first input of the load is a pair of inputs for receiving the cancellation current, and the second input of is a pair of inputs for receiving the differential current.

3. The electronic circuit of claim 1, wherein the output of the load is a single output for outputting the sum of the cancellation current and the differential current.

4. The electronic circuit of claim 1, wherein the differential current amplifier further comprises a control input for controlling a variable gain of the differential current amplifier, thereby controlling a gain used by the differential current amplifier for amplifying the first and second input currents to respectively create the first and second output currents.

5. The electronic circuit of claim 4, wherein the first capacitor and the second capacitor both have fixed capacitance values.

6. The electronic circuit of claim 1, wherein the differential current amplifier has a fixed gain.

7. The electronic circuit of claim 6, wherein the first capacitor has a variable capacitance value.

8. The electronic circuit of claim 1, wherein the regulator circuit is a low-dropout (LDO) regulator circuit.

9. The electronic circuit of claim 1, wherein the regulator circuit is an operational amplifier.

10. An electronic circuit with enhanced power supply rejection, the electronic circuit comprising:
a cancellation circuit comprising:
an input terminal receiving a reference signal;
a first capacitor directly coupled to the input terminal for receiving the reference signal and generating a first input current;
a second capacitor directly coupled to the input terminal for receiving the reference signal and generating a second input current;
a differential current amplifier comprising:
a first input for receiving the first input current from the first capacitor;
a second input for receiving the second input current from the second capacitor;
a first output for outputting a first cancellation current; and
a second output for outputting a second cancellation current; and
an output terminal generating a cancellation current comprising the first cancellation current and the second cancellation current; and
a regulator circuit comprising:
a differential pair of transistors outputting a differential current comprising a first differential current and a second differential current;
a load coupled to the differential pair of transistors, the load comprising:
a first input for receiving the sum of the first cancellation current and the first differential current;
a second input for receiving the sum of the second cancellation current and the second differential current; and
a single output outputting the sum of currents received through the first and second inputs of the load, wherein the load adds the currents received through the first and second inputs of the load before outputting the sum of currents as a load output current; and
a pass transistor having an input terminal coupled to the output of the load and an output terminal for generating an output current based on the load output current.

11. The electronic circuit of claim 10, wherein the differential current amplifier further comprises a control input for controlling a variable gain of the differential current amplifier, thereby controlling a gain used by the differential current amplifier for amplifying the first and second input currents to respectively create the first cancellation current and the second cancellation current.

12. The electronic circuit of claim 11, wherein the first capacitor and the second capacitor both have fixed capacitance values.

13. The electronic circuit of claim 10, wherein the differential current amplifier has a fixed gain.

14. The electronic circuit of claim 13, wherein the first capacitor has a variable capacitance value.

15. The electronic circuit of claim 10, wherein the regulator circuit is a low-dropout (LDO) regulator circuit.

16. The electronic circuit of claim 10, wherein the regulator circuit is an operational amplifier.

\* \* \* \* \*